United States Patent [19]
Obara

[11] Patent Number: 6,033,120
[45] Date of Patent: *Mar. 7, 2000

[54] COMPOUND BEARING ASSEMBLY FOR SWING ARM OF HAND DISC DRIVE

[75] Inventor: Rikuro Obara, Nagano-ken, Japan

[73] Assignee: Minebea Kabushiki-Kaisha, Nagano-ken, Japan

[*] Notice: This patent is subject to a terminal disclaimer.

[21] Appl. No.: 08/736,457

[22] Filed: Oct. 24, 1996

[30] Foreign Application Priority Data

Oct. 25, 1995 [JP] Japan ..................... 7-300610

[51] Int. Cl.$^7$ ................................... F16C 19/08
[52] U.S. Cl. ............................. 384/504; 384/520
[58] Field of Search ..................... 384/490, 504, 384/510, 512, 513, 517, 537

[56] References Cited

U.S. PATENT DOCUMENTS

| | | | |
|---|---|---|---|
| 2,858,200 | 3/1958 | Boullion | 384/520 X |
| 5,106,210 | 4/1992 | Chi | 384/510 X |
| 5,509,198 | 4/1996 | Takamizawa et al. | 29/898.09 |
| 5,556,209 | 9/1996 | Obara et al. | 384/504 |

*Primary Examiner*—Thomas R. Hannon
*Attorney, Agent, or Firm*—Lowe, Price, LeBlanc & Becker

[57] ABSTRACT

A compound bearing assembly for a swing arm of a hard disc drive is disclosed, which comprises a stepped shaft 1 having a large-diameter portion and a small-diameter portion 1b, the large-diameter portion 1a having an inner raceway groove 2a directly formed in the outer periphery, a distinct-component outer race ring 3 disposed around the large-diameter portion 1a and having an outer raceway groove 2b formed in the inner periphery, a plurality of balls provided between the inner and outer raceway grooves 2a and 2b, a ball bearing unit 5 having an inner and an outer race ring 5a and 5b and a plurality of balls 6 provided therebetween, the inner race ring 5a being fitted on the small-diameter portion 1b of the stepped shaft, and a sleeve-like spacer 1 between the distinct-component outer race ring 3 and the outer race ring 5b of the ball bearing unit 5 and having opposite end small-diameter portions, on which the outer race rings 3 and 5b are fitted, respectively.

2 Claims, 3 Drawing Sheets

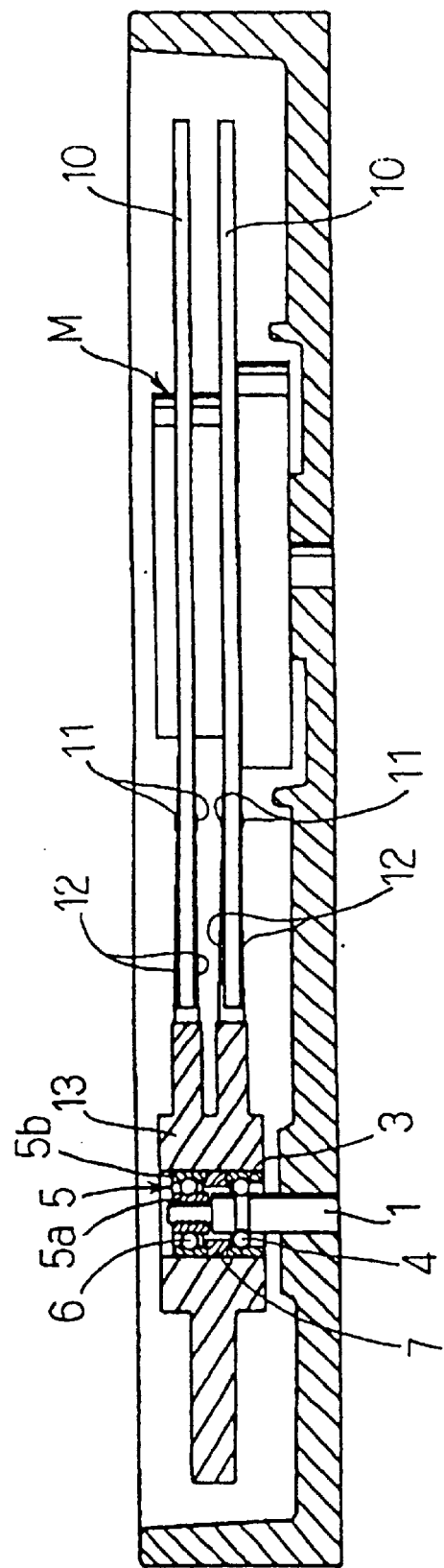

1

COMPOUND BEARING ASSEMBLY FOR SWING ARM OF HAND DISC DRIVE

BACKGROUND OF THE INVENTION

1. Field of the Invention

This invention relates to a compound bearing assembly for supporting a swing arm of a hard disc drive.

2. Description of the Prior Art

A prior art hard disc drive as shown in FIG. 2, comprises a magnetic disc 10 which is driven for rotation by a motor M, and a swing arm (or head arm) 12 carrying at the end thereof a magnetic head 11 for writing data in the disc 10 at a predetermined position thereof and reading out data from the disc 10 at a given position thereof.

The swing arm 12 has a stem rotatably supported by a compound bearing assembly which uses two ball bearing units. As shown in FIGS. 4(a) and 4(b), a prior art bearing assembly for supporting the swing arm comprises two ball bearing units A and B and a sleeve-like spacer C. These components of the bearing assembly are produced separately and supplied to the user, i.e., the hard disc drive manufacturer or the swing arm manufacturer, to be assembled on a shaft D.

In other words, with the conventional swing arm support bearing assembly, the user has to assemble the two ball bearing units on the shaft via the spacer. This poses the following problems.

(a) The shaft has to be sized in its production to the inner diameter of the inner race rings of the ball bearing units. In addition, its rigidity is subject to restrictions.

(b) The spacer which is a separate component from the two ball bearing units, should have highly accurate parallelism between and flatness of its opposite end finished surfaces.

(c) Since the spacer is only clampedly interposed between the outer race rings of the two ball bearing units, it is necessary for the user to implement a highly accurate assembly process so as to make the sleeve and the shaft coaxial to each other.

(d) For the above reasons, assembling of a prior art bearing by the user cannot be easily done.

SUMMARY OF THE INVENTION

An object of the invention is to provide a compound bearing assembly, which can solve the problems discussed above and can be directly used for a swing arm of a hard disc drive by a hard disc drive manufacturer or a swing arm manufacturer as its user.

A compound bearing assembly for a swing arm according to the invention, comprises a stepped shaft having a large-diameter portion and a small-diameter portion, the large-diameter portion having an inner raceway groove directly formed in the outer periphery, a distinct component outer race ring disposed around the large-diameter portion and having an outer raceway groove formed in the inner periphery, a plurality of balls provided between the inner and outer raceway grooves, a ball bearing unit having an inner and an outer race ring and a plurality of other balls provided therebetween, the inner race ring being fitted on the small-diameter portion of the stepped shaft, and a sleeve-like spacer surrounding a portion of the stepped shaft between the distinct component outer race ring and the outer race ring of the ball bearing unit and having opposite end small-diameter portions, the distinct component outer race ring and the outer race ring of the ball bearing unit being fitted on the opposite end small-diameter portions, respectively.

In an embodiment of the invention, the inner race ring of the ball bearing unit has an equal outer diameter to the outer diameter of the large-diameter portion of the stepped shaft, and the outer race ring of the ball bearing unit has equal outer and inner diameters to the outer and inner diameters, respectively of the large-diameter portion, so that all the balls are the same in diameter.

BRIEF DESCRIPTION OF THE DRAWINGS

FIG. 3 is a sectional view showing a swing arm supported by a compound bearing assembly according to the invention.

DETAILED DESCRIPTION OF THE PREFERRED EMBODIMENTS

Figure 1:
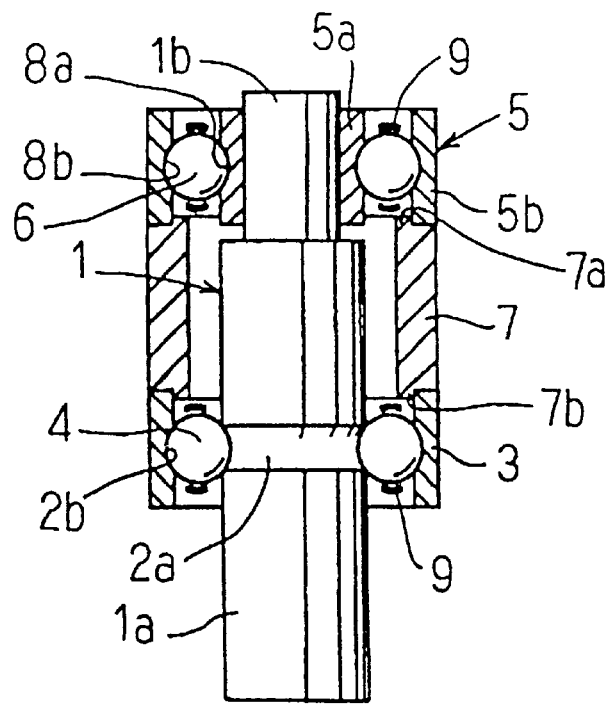
FIG. 1 is a sectional view showing a compound bearing assembly in a first embodiment of the invention.
Figure 2:
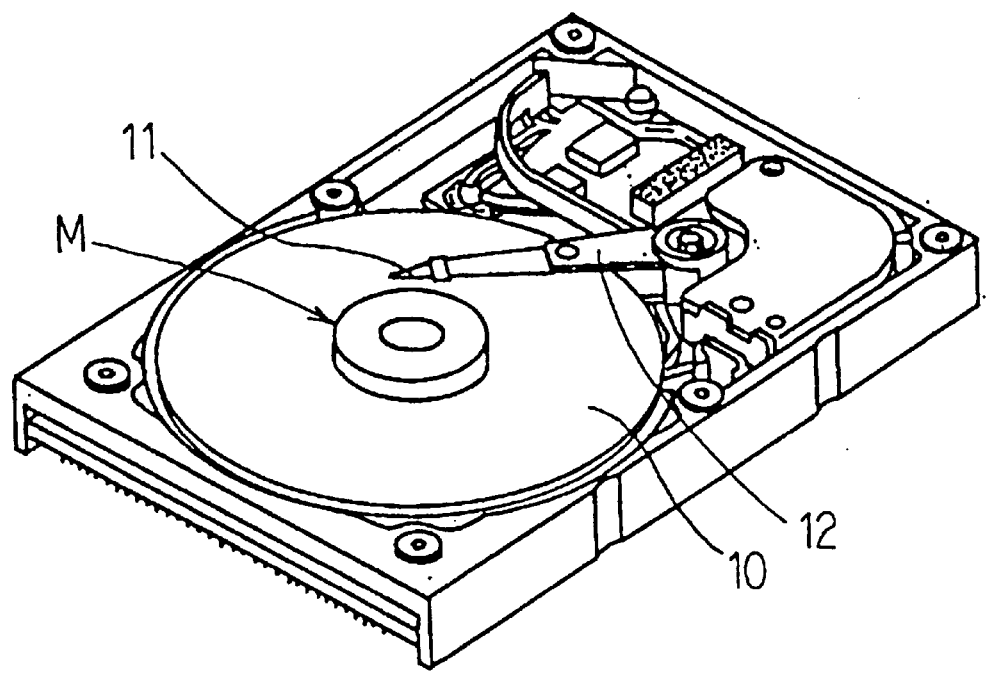
FIG. 2 is a perspective view showing a hard disc drive.
Figure 4A:
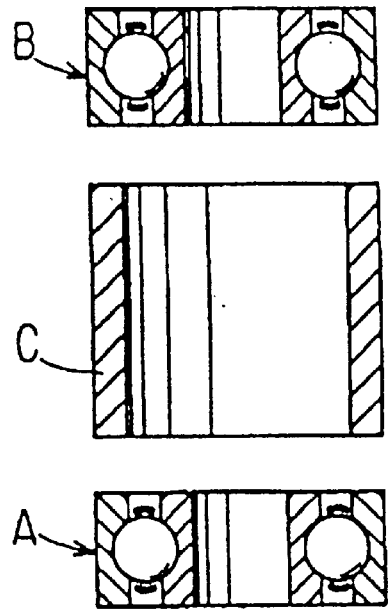
FIGS. 4(a) and 4(b) are sectional views showing a prior art swing arm bearing assembly, FIG. 4(a) showing ball bearing units and a spacer before being assembled, FIG. 4(b) showing the ball bearing units and spacer having been assembled on a shaft.
Figure 4B:
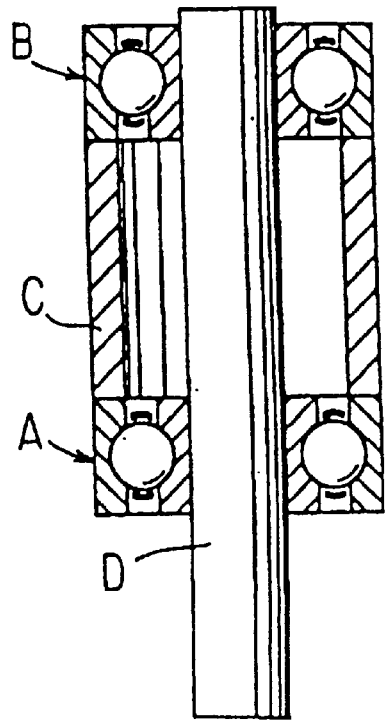

Referring to FIG. 1, reference numeral 1 designates a stepped shaft having a large-diameter portion 1a and a small-diameter portion 1b, the large-diameter portion 1a having an inner raceway groove 2a directly formed in the outer periphery.

Reference numeral 3 designates an outer race ring, which is provided around the large-diameter portion 1a and assembled on the same with a plurality of balls 4 provided between an outer raceway groove 2b formed in its inner periphery and the inner raceway groove 2a in the large-diameter portion 1a.

A ball bearing unit 5 which has an inner and an outer race ring 5a and 5b and a plurality of balls 6 provided therebetween, has the inner race ring 5a fitted on and secured to the small-diameter portion 1b of the stepped shaft 1.

Reference numeral 7 designates a sleeve-like spacer, which surrounds the stepped shaft 1 and has opposite end small-diameter portions 7a and 7b with the outer diameter threreof set for snug fitting in the outer race ring 3 and the outer race ring 5b of the ball bearing unit 5. The spacer 7 has its small-diameter portions 7a and 7b fitted in and secured to the outer race rings 3 and 5b.

The inner race ring 5a of the ball bearing unit 5 has an outer diameter equal to the outer diameter of the large-diameter portion 1a, and the outer race ring 5b of the ball bearing unit 5 has outer and inner diameters equal to the outer and inner diameters, respectively, of the outer race ring 3 around the large-diameter portion 1a.

Reference symbols 8a and 8b designate raceway grooves formed in the inner and outer race rings 5a and 5b of the ball bearing unit 5, and reference numeral 9 designates ball retainers.

In assembling, the inner race ring 5a of the ball bearing unit 5 is slidably fitted on the small-diameter portion 1b of the stepped shaft 1, then an adequate pre-load is applied to the outer end surface (i.e., the upper end surface in FIG. 1) of the inner race ring 5a, and in this state the inner race ring 5a is secured by means of an adhesive to the small-diameter portion 1b of the stepped shaft 1.

In this way, the spacer and the outer race rings at the opposite ends thereof are coupled together into a sleeve-like outer race ring of the compound bearing assembly, and the outer ring, the spacer, and the ball bearing unit are assembled on the stepped shaft.

In the above embodiments, all the balls were the same in diameter, but it is possible to use balls having different diameters for the sides of the large- and small-diameter portions, respectively.

The shaft of the compound bearing assembly thus obtained is erected from a base member of a hard disc drive by securing a stem of its large-diameter portion to the base member. Then, a boss 13 of a stem of a swing arm 12 (shown in FIG. 3) is fitted on and secured by means of an adhesive to the sleeve-like outer race ring.

The swing arm which is thus mounted on the compound bearing assembly thus can be rotated about the shaft thereof.

With the compound bearing assembly having the above construction according to the invention, the following functions and effects are obtainable.

(a) Since the compound bearing assembly according to the invention the spacer and the outer race rings at the opposite ends thereof are coupled together into a sleeve-like outer race ring and the outer race ring, the spacer, the ball bearing unit and the balls are assembled on the shaft, the user need not assemble any of these components, and the compound bearing assembly can be readily and reliably mounted on a swing arm of a hard disc drive by fitting the swing arm stem boss 13 on and securing the same by means of an adhesive to it.

(b) Since the large-diameter portion of the stepped shaft in the bearing assembly has the inner raceway groove which is directly formed in the outer periphery, the conventional inner race ring is unnecessary, and correspondingly the shaft is partly increased in diameter to provide the stepped shaft, which thus has increased rigidity.

(c) The spacer can be fabricated highly accurately by the bearing assembly manufacturer such that it conforms to the dimensions of the ball bearing unit. In addition, since the opposite end small-diameter portions of the spacer are fitted in and coupled to the outer race rings into the sleeve-like outer race ring of the compound bearing assembly, the accuracy of the coaxial coupling of the spacer, the outer rings and the shaft, and hence the accuracy of assembling, can be improved.

(d) Only a single conventional ball bearing unit, and hence only a single inner race ring, is needed, and it is possible to provide a bearing assembly having a reduced number of components.

What is claimed is:

1. A compound bearing assembly for a swing arm of a hard disc drive comprising:

a stepped shaft having a large-diameter portion and a small-diameter portion, said large-diameter portion having an inner raceway groove directly formed in the outer periphery;

a distinct-component outer race ring disposed around said large-diameter portion and having an outer raceway groove formed in the inner periphery;

a plurality of balls provided between said inner and outer raceway grooves;

a ball bearing unit having an inner and an outer race ring and a plurality of other balls provided therebetween, said inner race ring being fitted on said small-diameter portion of said stepped shaft; and a sleeve-like spacer surrounding a portion of said stepped shaft between said distinct-component outer race ring and said outer race ring of said ball bearing unit and having opposite end small-diameter portions, said distinct-component outer race ring and said outer race ring of said ball bearing unit being fitted on said opposite end small-diameter portions, respectively;

said distinct-component outer race ring, said sleeve-like spacer and said ball bearing unit being thereby integrally assembled on said stepped shaft.

2. The compound bearing assembly for a swing arm of a hard disc drive according to claim 1, wherein said inner race ring of said ball bearing unit having an equal diameter to the outer diameter of said large-diameter portion of said stepped shaft, said outer race ring of said ball bearing unit having equal outer and inner diameters to the outer and inner diameters, respectively, to said large-diameter portion.

* * * * *